United States Patent Office 3,530,145
Patented Sept. 22, 1970

3,530,145
BIS-DITHIOLYLIDENE COMPOUNDS
AND PREPARATION
Erwin Klingsberg, Mountainside, N.J., assignor to American Cyanamid Company, Stamford, Conn., a corporation of Maine
No Drawing. Filed Dec. 14, 1967, Ser. No. 690,390
Int. Cl. C07d 71/00
U.S. Cl. 260—327                                              8 Claims

ABSTRACT OF THE DISCLOSURE

3 - chloro - 1,2 - dithiolium salts condense with lower aliphatic bis-primary amides such as urea, biuret, malonamide or methylmalonamide, optionally with sulfurization, to form bis-dithiolylidene compounds of the formula

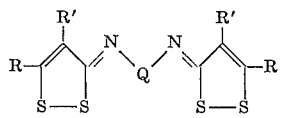

where R and R' typically are hydrogen, phenyl, or together with dithiole ring form a benzo or naphtho ring; and Q is the divalent radical

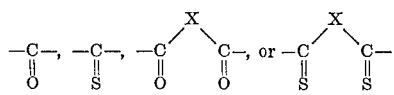

where X is

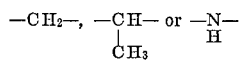

The compounds are disperse dyes.

---

This invention relates to heterocyclic carbon compounds wherein the hetero atom is sulfur, processes for preparation, and intermediates.

More particularly, the compounds of the invention are bis-dithiolylidene derivatives of lower aliphatic diamides or thiodiamides and have the formula:

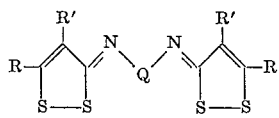

where R and R' are hydrogen, phenyl, or together with the dithiole ring form a monocyclic or fused bicyclic aromatic group; and Q is the divalent radical

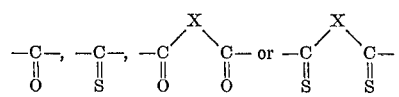

where X is

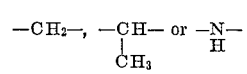

In the above definition it should be understood that R and R' may each be hydrogen or phenyl, or one of R and R' may be hydrogen and the other phenyl. In addition, the preferred ring structures defined by R taken with R' contain a total of not more than 12 ring carbon atoms. These ring structures, however, may be substituted with one or more alkyl groups, preferably lower alkyl, as will be apparent from the description of the reactants from which they are derived. The term "aromatic group" is intended to include such alkyl-substituted ring structures.

The amide derivatives are prepared by condensing a 3-chloro-1,2-dithiolium salt with a lower aliphatic primary amide, in proportions of 2 moles to 1 mole, respectively, as follows:

(A)

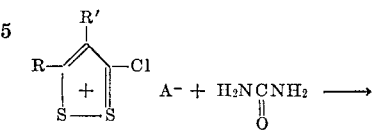

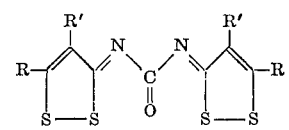

(B)

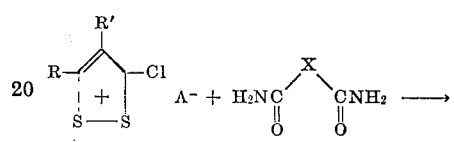

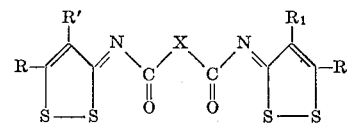

In the above equations A, R and R' are as defined above, and X is a divalent radical such as

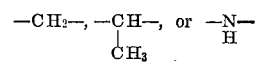

Typical 3-chloro-1,2-dithiolium salts are 3-chloro-1,2-dithiolium chloride, 3-chloro - 5 - phenyl - 1,2 - dithiolium chloride, 3-chloro-4,5-diphenyl-1,2-dithiolium chloride, 3-chloro-1,2-benzodithiolium chloride (prepared by reacting 3H-1,2-benzodithiole-3-thione and sulfur dichloride), and 3 - chloro - 5 - methylnaphtho[1,2-c]-1,2-dithiolium chloride which is the salt obtained by the reaction of 5-methyl-3H-naphtho[1,2-c]-1,2-dithiole-3-thione and sulfur dichloride. The preparation of some of the salts is described further hereinafter, by Faust and Mayer, Ann. 688, 150 (1965) and in U.S. Pat. 3,211,749.

Typical of the lower aliphatic primary amides are urea, methylurea, biuret, malonamide and 2-methylmalonamide.

The thiodiamide derivatives are prepared by sulfurization of the products of Equations A and B. The result is replacement of the carbonyl groups with thiocarbonyl groups. An effective sulfurization agent is $P_2S_5$, particularly when the sulfurization is conducted in a high boiling non-polar solvent medium. Sulfurization may also be effected in the absence of such non-polar solvents, typically by fusion with $P_2S_5$ in a melt of 3H-1,2-benzodithiole-3-thione at from about 150° C. to about 170° C.

Other conditions of reaction are not critical. For example, the reactions of Equations A and B are conveniently conducted at from about 130° C. to about 170° C. in a high boiling non-polar solvent such as orthochlorotoluene, xylene, or orthodichlorobenzene. The time of reaction, order of addition, and isolation procedures will be variable depending on the reactants, reaction temperature, and other routine considerations.

The bis-dithiolylidene compounds of the invention are useful as disperse dyes. For example, they impart orange to pink shades to nylon and polyester fiber and fabrics when applied at 0.5%, based on the weight of the fibrous material, from an aqueous dyebath with a standard carrier such as 48% methyl salicylate aqueous emulsion, at 200° F. for one hour.

The following examples are intended as further illustration of this invention but not to limit the scope. Temperatures are in centigrade unless otherwise noted.

EXAMPLE 1

1,3-di-3H-1,2-benzodithiol-3-ylideneurea

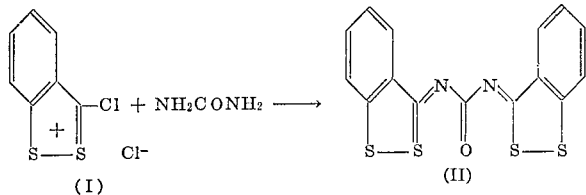

Part A: Sulfur dichloride (30 milliliters) was added in portions to a warm solution of 30 grams 3H-1,2-benzodithiole-3-thione in 300 milliliters benzene, and the mixture stirred and refluxed for one-half hour. The product was filtered, washed with carbon disulfide, dried quickly, and immediately transferred to a stoppered flask to prevent the entry of atmospheric moisture.

Part B: A mixture of 16.6 grams of the above prepared 4,5-benzo-3-chloro - 1,2 - benzodithiolium chloride (I), 1.8 grams urea, and 150 milliliters o-chlorotoluene was stirred and refluxed for two hours, cooled, and filtered. The product (II) was digested in warm alcohol, filtered, and dried, giving a brown solid. It crystallized as a yellow solid from o-dichlorobenzene or chlorobenzene, melting point 273–5° C. (decomposition).

Analysis.—Calcd. for $C_{15}H_8N_2OS_4$ (percent): C, 50.0; H, 2.2; S, 35.6. Found (percent): C, 50.4; H, 2.0; S, 35.5.

The same product was obtained from methylurea instead of urea; demethylation occurs during the condensation.

EXAMPLE 2

1,3-di-3H-1,2-benzodithiol-3-ylidenethiourea

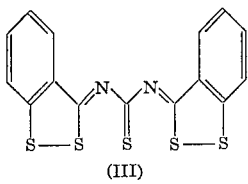

Equal weights of product (II) of Example 1, Part B and phosphorus pentasulfide were stirred at reflux for five minutes in o-chlorotoluene and then filtered. The product crystallized from the filtrate on cooling, and gave pink crystals from pyridine or chlorobenzene, melting point 277° C. (decomposition). It gave a marked melting point depression on admixture with the product of Example 1.

Analysis.—Calcd. for $C_{15}H_8N_2S_5$ (percent): C, 47.9; H, 2.1; N, 7.4; S, 42.5. Found (percent): C, 48.3; H, 2.3; N, 7.3; S, 42.3.

This product gives attractive pink dyeings on nylon or polyester fiber, when applied by standard methods.

EXAMPLE 3

The product of Example 2 was also obtained by fusing the reactants of Example 2 with 3H-1,2-benzodithiole-3-thione as solvent instead of o-chlorotoluene for five minutes at 150° C.

EXAMPLE 4

1,3-bis(5-phenyl-1,2-dithiol-3-ylidene)urea

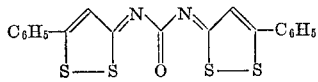

In the procedure of Example 1, Part B the 3-chloro-1,2-benzodithiolium chloride was replaced by an equivalent quantity of 3-chloro-5-phenyl-1,2-dithiolium chloride. The product gave orange crystals from pyridine, melting point 245° C. (decomposition).

Analysis.—Calcd. for $C_{19}H_{12}N_2OS_4$ (percent): C, 55.4; H, 2.9; S, 31.1. Found (percent): C, 55.1; H, 2.9; S, 31.3.

EXAMPLE 5

1,3-bis(5-phenyl-1,2-dithiol-3-ylidene)thiourea

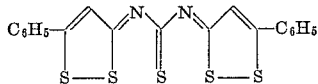

This product was obtained from the product of Example 4 using the procedures of Example 2 or 3. It gave orange crystals from aqueous pyridine, melting point 205° C. (decomposition).

Analysis.—Calcd. for $C_{19}H_{12}N_2S_5$ (percent): C, 53.3; H, 2.8; N, 6.5; S, 37.4. Found (percent): C, 53.3; H, 2.8; N, 6.2; S, 37.5.

This product gave nylon and polyester dyeings similar to those of the product of Example 2.

EXAMPLE 6

2-methyl-N,N'-di-3H-1,2-benzodithiol-3-ylidenemalonamide

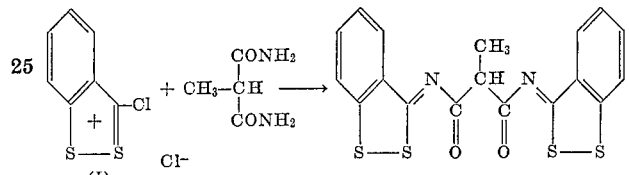

To 21.2 grams 3-chloro-1,2-benzodithiolium chloride, prepared as in Example 1, was added 5.0 grams 2-methylmalonamide and 200 milliliters o-chlorotoluene. The mixture was stirred at reflux for two hours, cooled and filtered. The product was digested in warm alcohol, giving a brick-red solid which crystallized from butyl acetate or pyridine, melting point 227–9° C. (decomposition).

Analysis.—Calcd. for $C_{18}H_{12}N_2O_2S_4$ (percent): C, 51.9; H, 2.9; N, 6.7. Found (percent): C, 51.6; H, 3.2; N, 6.5.

The product gives orange dyeings on acetate, polyester, nylon and modacrylic fibers.

EXAMPLE 7

2-methyl-N,N'-di-3H-1,2-benzodithiol-3-ylidenedithiomalonamide

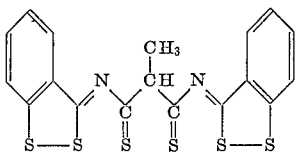

A mixture of 1.00 gram of the product of Example 6, 1.60 grams phosphorus pentasulfide, and 100 milliliters o-xylene was stirred and refluxed for 40 minutes, cooled and filtered. The product was digested in dilute sodium hydroxide, giving a purple solid which crystallized from chlorobenzene, melting point 246° C. (decomposition).

EXAMPLE 8

N,N'-di-3H-1,2-benzodithiol-3-ylidenemalonamide

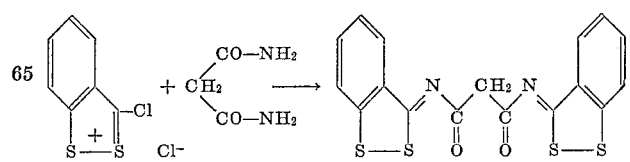

To 21.8 grams 3-chloro-1,2-benzodithiolium chloride, prepared as in Example 1, was added 4.1 grams malonamide and 200 milliliters o-chlorotoluene. The mixture was stirred at 170° for 4 hours, cooled and filtered. Digestion in alcohol gave a brick red product which crystallized from pyridine, melting point 238° C. (decomposition).

EXAMPLE 9

N,N'-di-3H-1,2-benzodithiol-3-ylidenedithiomalonamide

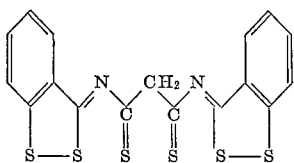

This product was obtained from the product of Example 8, using the procedure of Example 7

EXAMPLE 10

1,5-di-3H-1,2-benzodithiol-3-ylidenebiuret

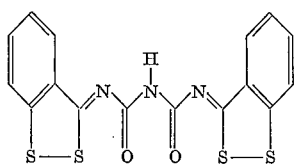

A mixture of 22 grams 3-chloro-1,2-benzodithiolium chloride, 4.8 grams biuret and 200 milliliters o-chlorotoluene was stirred at reflux for seven hours and filtered. The product was digested in alcoholic alkali and filtered. It crystallized from pyridine as a yellow solid, melting point 275° C. (decomposition). It reacts with $P_2S_5$ by the methods described above to form the thiocarbonyl analog.

EXAMPLE 11

N,N'-bis(5-phenyl-1,2-dithiol-3-ylidene)malonamide

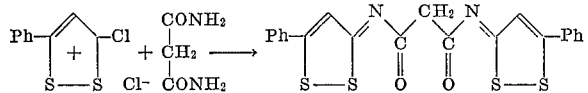

To 20.5 grams 3-chloro-5-phenyl-1,2-dithiolium chloride, was added 3.9 grams malonamide and 250 milliliters o-chlorotoluene. The mixture was refluxed for 2 hours, cooled and filtered. The brown product was treated with a dilute ethanol-sodium hydroxide solution, giving a dark green solid which crystallized from glacial acetic acid, melting point 206° C.

I claim:
1. Compounds of the formula

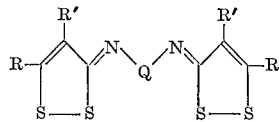

where R and R' are hydrogen, phenyl, or together with the dithiole ring form a benzo or naptho ring; and Q is the divalent radical

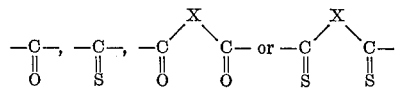

where X is

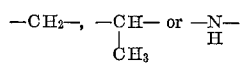

2. A compound of claim 1 which is 1,3-di-3H-1,2-benzodithiol-3-ylideneurea.

3. A compound of claim 1 which is 1,3-di-3H-1,2-benzodithiol-3-ylidenethiourea.

4. A compound of claim 1 which is 2-methyl-N,N'-di-3H-1,2-benzodithiol-3-ylidenemalonamide.

5. A compound of claim 1 which is 2-methyl-N,N'-di-3H-1,2-benzodithiol-3-ylidenedithiomalonamide.

6. A process for preparing the carbonyl compounds of claim 1 which comprises reacting

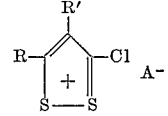

with urea, methylurea, biuret, malonamide or 2-methylmalonamide, where R and R' are as defined in claim 1 and $A^-$ is an anion.

7. A process as defined in claim 6 which comprises additionally reacting the carbonyl product of claim 6 with $P_2S_5$ in a non-polar solvent medium.

8. A process as defined in claim 6 which comprises additionally fusing the product of claim 6 with $P_2S_5$ in a melt of 4,5-benzo-1,2-dithiole-3-thione.

References Cited

UNITED STATES PATENTS 3,211,749   10/1965   Klingsberg _____ 260—327

JAMES A. PATTEN, Primary Examiner

U.S. Cl. X.R.

8—55, 57